July 26, 1949.  W. MOFFATT  2,477,260
WELDED CONNECTOR FOR TUBULAR FRAME STRUCTURES
Filed Sept. 12, 1947
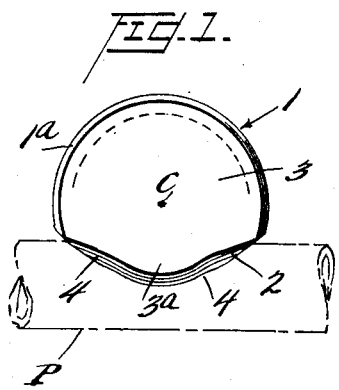
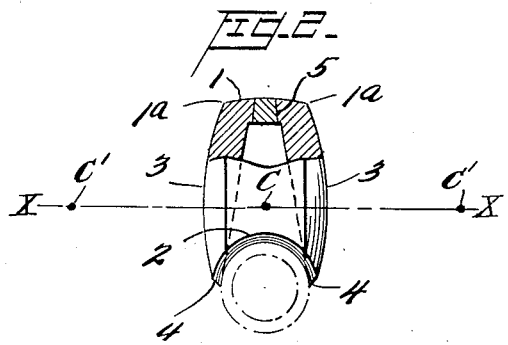
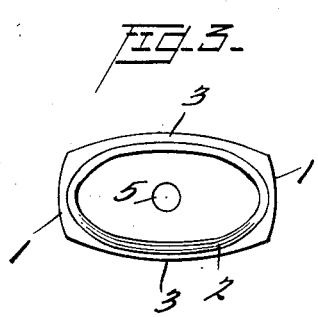
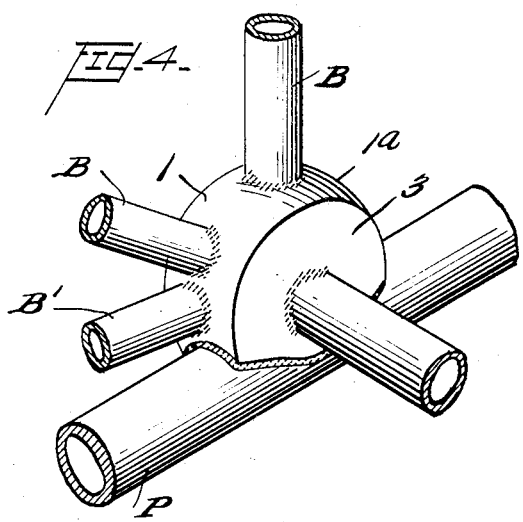
INVENTOR.
Wilder Moffatt,
BY
ATTORNEY Patented July 26, 1949

2,477,260

UNITED STATES PATENT OFFICE 2,477,260

WELDED CONNECTOR FOR TUBULAR FRAME STRUCTURES

Wilder Moffatt, Upper Macungie Township, Lehigh County, Pa., assignor to Nassau Products, Allentown, Pa., a corporation of Pennsylvania Application September 12, 1947, Serial No. 773,695

3 Claims. (Cl. 287—54)

This invention relates to connector fittings for joining intersecting tubular members, such as metal pipe, in which the fitting is seated upon and welded to the circumferential wall of one pipe, herein referred to as the run pipe, and serves as an anchorage to which the end of another pipe, hereinafter called the brace pipe, is welded. The term "welded" is used generally herein to also include brazed, soldered or similarly bonded joints such as are well-known in the metal working art.

An important object of my invention is to provide a connector of the above character which is especially suitable for the manufacture of welded metal frame structures, such as scaffolds, platforms, towers, railings and the like, in which the brace pipes interconnecting the run pipes extend, usually truss-like, at various angles, either in the same plane or in different planes.

Heretofore in accordance with one common method of fabricating such tubular frame structures, it has been the practice to weld the end of the brace pipe directly to the run pipe. This involves cutting off the end of the brace pipe at the particular angle of its intersection with the run pipe and then trimming the cut end so that it more or less straddles the run pipe, the two pipes subsequently being welded together at their junction. Because such cutting and trimming operations call for the exercise of a substantial amount of care and skill on the part of the workman, production is necessarily slowed down, especially in the case of frame structures requiring a large number of such welded joints. The situation is further complicated when, as sometimes happens, pipes of various sizes must be used for the same or for different jobs calling for changes in the set-up of the cutting and trimming equipment in the shop to take care of off-standard sizes of pipe.

It is an important object of my invention to provide a connector intended to overcome the above disadvantages and which permits the making of welded joints between run and brace pipes without necessitating complicated cutting and trimming operations but which allows the ends of the brace pipes to be cut off square—that is, perpendicular to the longitudinal axis—regardless of the particular angles of intersection between the pipes.

More particularly this object is accomplished by so constructing the connector that it is adapted to straddle and form a readily weldable connection with the run pipe and which presents a spheroidally rounded surface such that the brace pipe, or several of such pipes, may solidly foot against and be welded to the connector in substantially radial relationship therewith.

A further object of my invention is to provide an arcuately shaped connector of the above character having generally flattened sides which do not appreciably overhang the sides of the run pipe, both the peripheral portion and the sides of the connector being spheroidally curved to permit a brace pipe (or several brace pipes) to be projected therefrom at various angles so as to lie either in a common plane or in different planes.

Still another object of my invention is to provide a connector of the above character which is so constructed and arranged as to allow a brace pipe to be welded to the connector so as to extend approximately parallel with the run pipe.

An additional object of my invention is to provide a connector of the above character in which the saddle is adapted to seat upon and embrace the circumference of a run pipe and being so beveled adjacent its surface of contact with the run pipe as to produce a fillet of welding material when the connector is welded to the run pipe, thus serving to strongly bond the connector to the run pipe.

Yet another object of my invention is to provide a connector of the above character which is of hollow construction and which can be expeditiously produced either by casting or by forging in a one-step operation.

Other objects and advantages will be apparent from the following detailed description of a preferred embodiment of my invention, reference being had to the annexed drawing in which:

Figure 1 is a side view of a welded brace connector for tubular frames seated upon a run pipe preparatory to welding;

Figure 2 is an end view in part sectional, of the connector of Fig. 1;

Figure 3 is a bottom view of the connector; and

Figure 4 is a perspective view showing the connector welded to the run pipe and having several brace pipes welded thereto.

The connector fitting, viewed in profile as shown in Fig. 1 of the drawing, is defined generally by an arcuately-curved peripheral portion 1 of uniform width and two side portions 3 which intersect the peripheral portion in directions approximately perpendicularly thereto and form bounding edges or corners 1a. The peripheral portion terminates in a saddle portion 2 semi-circularly shaped in transverse cross-section to seat upon the circumference of a run pipe P and this saddle extends between and joins the ends of the peripheral portion 1. The peripheral portion 1, approximately corresponding in width to that of the saddle (and hence to the diameter of the run pipe), extends in profile throughout an arc somewhat greater than 180 degrees, as best shown in Fig. 1, the center of its curvature being indicated at C. The peripheral portion is of spheroidal shape, and its center of spherical curvature also coincides with the point C, as indicated in Fig. 2.

The two sides 3 of the connector are likewise spherioidally formed, being developed about the centers of curvature $C^1$ located upon opposite sides of the connector and in a common plane, designated X—X, which also includes the center of spherical curvature C of the peripheral portion 1. The radii of spherical curvature of the two sides of the connector are equal in length, while the radius of spherical curvature of the peripheral portion 1 is substantially shorter, being about one-half the radius of a side 3. The sides 3 intermediate the ends of the connector are curved downwardly so as to define lobes 3a which hug the circumference of the run pipe P and allow the saddle to make continuous perimetral line contact with the run pipe.

The connector is composed of metal and is preferably made hollow so as to reduce weight and save metal. It may be either cast or forged, and when made by the latter process the side walls 3 will taper in thickness as indicated by the full and dotted lines in Fig. 2, whereby the inside cavity of the connector will increase in size in a direction toward, and open through, the saddle portion 2. The taper shape of the cavity is such as to afford sufficient draft for the withdrawal of the forging tool.

The edge 4 defining the perimeter of the saddle 2 is beveled downwardly and inwardly, as best shown in Fig. 2, to allow a generous deposition of welding metal when the connector is bonded to the run pipe P and to produce a smooth fillet between the saddle and the run pipe. A vent 5 from the interior of the connector through its peripheral portion can be provided to allow the escape of trapped air or gases during welding of the connector to the run pipe, and this vent may be subsequently closed, as indicated in Fig. 2.

After the connector has been welded in place on the run pipe P, the square-cut ends of the brace pipes B may be abutted against the spheroidal surfaces of the connector so as to make firm, continuous circular-line contact therewith. These brace pipes may extend in the same plane with the run pipe, in which case they will foot against the peripheral portion 1 of the connector, or they may project laterally from the connector, under which latter circumstances the brace pipes will bear against the spheroidally surfaced sides 3 of the connector, as illustrated in Fig. 4. Because the peripheral portion 1 extends throughout more than a half-circle, viewing the connector in profile, a brace pipe $B^1$ may be welded to the connector so as to extend almost parallel to the run pipe P.

While it is contemplated that the connectors ordinarily will be supplied for use with a specific size of run pipe (or solid bar) in order that the saddle may neatly fit its circumference, it is not necessary to precisely match the connectors to particular sizes of run pipes but a connector usually will serve effectively with a run pipe one or two sizes larger or smaller than that for which it is especially designed, although the fit of the saddle will not be so snug. The brace pipes may be of either the same size as the run pipe or of a diffferent size, this being a condition limited only by the abutment area presented by the connector to the ends of these pipes. The connector has been herein described and illustrated as of hollow construction; however it may be made solid if desired, especially when it is intended for use under circumstances where explosive gases might become trapped within the connector and constitute a possible fire hazard during welding.

Because of its flattened spheroidal sides 3, the connector does not appreciably overhang the run pipe and therefore two or more run pipes may be placed in close parallel relationship, such as may be necessary under some conditions; and because the connector is of approximately semicircular contour in profile view, the saddle which straddles the run pipe makes stable contact engagement which is especially advantageous when the connector is called upon to resist lateral thrusts transmitted through a brace pipe abutting a side of the connector.

While I have described a preferred embodiment of my welded brace connector for tubular frame structures, it is to be understood that various and reasonable changes in construction and design from those herein described and illustrated may be made without departing from the spirit of my invention as defined by the following claims.

I claim:

1. In means for joining tubular elements by welding with the circumferential wall of a cylindrical element, a metallic connector having a relatively wide, arcuately-curved peripheral portion and sides disposed approximately perpendicular to the peripheral portion, the peripheral portion and sides being spheroidally curved from non-coincident centers of curvature and said connector defining a saddle extending between the ends of the peripheral portion and arranged to straddle a circumferential wall portion of the cylindrical element.

2. In means for joining a tubular element by welding with the circumferential wall of a cylindrical element, a metallic connector having a relatively wide, arcuately-curved peripheral portion in excess of 180 degrees and sides disposed approximately perpendicular to the peripheral portion, the peripheral portion and sides being spheroidally curved from non-coincident centers of curvature and said connector defining a saddle extending between the ends of the peripheral portion and adapted to straddle and make substantially continuous perimetral contact with a circumferential wall portion of the cylindrical element.

3. In means for joining the end of one cylindrical element by welding with the circumferential wall of another cylindrical element, a hollow metallic connector having a relatively wide arcuately-curved peripheral portion and sides disposed generally perpendicular to the peripheral portion, the peripheral portion and sides being spheroidally curved from non-coincident centers of curvature and said connector defining a saddle extending between the ends of the arc of curvature of the peripheral portion adapted to straddle one of said cylindrical elements, the perimetral edges of said saddle being beveled downwardly and inwardly and adapted to make substantially continuous perimetral line-contact with a circumferential wall portion of the other of said cylindrical elements.

WILDER MOFFATT.

REFERENCES CITED

The following references are of record in the file of this patent:

UNITED STATES PATENTS

| Number | Name | Date |
|---|---|---|
| 500,941 | Perkins | July 4, 1893 |
| 2,189,201 | Flader | Feb. 6, 1940 |
| 2,387,154 | Kalwitz | Oct. 16, 1945 |